United States Patent
Begwani et al.

(10) Patent No.: US 9,998,340 B2
(45) Date of Patent: *Jun. 12, 2018

(54) METHOD AND SYSTEM TO MONITOR A NETWORK

(71) Applicant: AT&T INTELLECTUAL PROPERTY I, L.P., Atlanta, GA (US)

(72) Inventors: Vimal Begwani, Holmdel, NJ (US); Shekar C. Sundaramurthy, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/587,956

(22) Filed: May 5, 2017

(65) Prior Publication Data

US 2017/0244617 A1    Aug. 24, 2017

Related U.S. Application Data

(63) Continuation of application No. 14/508,335, filed on Oct. 7, 2014, now Pat. No. 9,674,057.

(51) Int. Cl.
H04L 12/26    (2006.01)
(52) U.S. Cl.
CPC .............. *H04L 43/04* (2013.01); *H04L 43/08* (2013.01)
(58) Field of Classification Search
CPC ................................ H04L 43/08; H04L 43/04
See application file for complete search history.

(56) References Cited

U.S. PATENT DOCUMENTS 5,867,495 A    2/1999  Elliott et al.
6,085,238 A    7/2000  Yuasa et al.
(Continued)

FOREIGN PATENT DOCUMENTS

EP              1257945 A2   11/2002
WO         WO 98/47298      10/1998
WO     WO 2011/150074 A2   12/2011

OTHER PUBLICATIONS

Montagna, Sergio, et al., "On the Analytical Characterization of a Real Life Virtual Network Function: The Italtel Virtual Session Border Control", Cloud Computing 2013, The Fourth International Conference on Cloud Computing, GRIDs and Virtualization, 2013.

(Continued)

*Primary Examiner* — Jianye Wu
(74) *Attorney, Agent, or Firm* — Hoffmann & Baron, LLP

(57) ABSTRACT

A method of monitoring a network includes receiving by a user plane record aggregator first data associated with a user plane packet, the first data being selected by a user plane network element from second data, the second data being stored in a plurality of information fields, the plurality of information fields being associated with the user plane network element, the second data being obtained by the user plane network element from user plane traffic, the user plane network element processing the user plane packet in accordance with a user plane network function. The method further includes determining by an aggregation device a characteristic associated with the user plane traffic from the first data, thereby monitoring the user plane traffic without requiring a tap.

20 Claims, 6 Drawing Sheets

(56) References Cited

U.S. PATENT DOCUMENTS

| | | |
|---|---|---|
| 6,212,559 B1 | 4/2001 | Bixler et al. |
| 6,442,615 B1 | 8/2002 | Nordenstam et al. |
| 6,662,221 B1 | 12/2003 | Gonda et al. |
| 6,788,681 B1 | 9/2004 | Hurren et al. |
| 7,020,145 B1 | 3/2006 | Symons et al. |
| 7,068,666 B2 | 6/2006 | Foster et al. |
| 7,916,682 B2 | 3/2011 | Nagarajan et al. |
| 8,023,421 B2 | 9/2011 | Lloyd et al. |
| 8,224,971 B1 | 7/2012 | Miller et al. |
| 8,312,129 B1 | 11/2012 | Miller et al. |
| 8,335,841 B2 | 12/2012 | Kumbalimutt |
| 8,370,488 B1 | 2/2013 | Miller et al. |
| 8,392,608 B1 | 3/2013 | Miller et al. |
| 8,489,728 B2 | 7/2013 | Vinberg et al. |
| 8,660,132 B2 | 2/2014 | Assarpour et al. |
| 2005/0257262 A1 | 11/2005 | Matityahu et al. |
| 2009/0201819 A1* | 8/2009 | Mizutani ............... H04L 12/185 370/241.1 |
| 2014/0052852 A1 | 2/2014 | Dufour et al. |
| 2014/0201374 A1 | 7/2014 | Ashwood-Smith et al. |
| 2015/0124622 A1* | 5/2015 | Kovvali ............ H04W 28/0215 370/236 |
| 2015/0365312 A1* | 12/2015 | Pasuparthy ............. H04L 43/08 709/224 |

OTHER PUBLICATIONS

Monteleone, Giuseppe, et al., "Session Border Controller Virtualization Towards Service-Defined Networks Based on NFV and SDN", Future Networks and Services (SDN4FNS), 2013 IEEE SDN, IEEE 2013.

Mattos, Diogo MF, et al., "Virtual network performance evaluation for future internet architectures", Journal of Emerging Technologies in Web Intelligence, 4.4 (2012), 304-314.

Batalle Oronich, Josep., "Experimentation on Virtualized Routing Function Migration Using OpenFlow", Master Thesis, Telematics Engineering Department (ENTEL), Technical University of Catalonia (UPC), Barcelona, Spain, 2013.

* cited by examiner

METHOD AND SYSTEM TO MONITOR A NETWORK

CROSS REFERENCE TO RELATED APPLICATION

This application is a continuation of U.S. patent application Ser. No. 14/508,335, filed on Oct. 7, 2014, the disclosure of which is incorporated by reference herein in its entirety.

BACKGROUND

Technical Field

Embodiments disclosed herein relate to monitoring a network. In particular, embodiments disclosed herein relate to determining characteristics of user plane and control plane traffic based on data from the user plane and control plane traffic selected and processed by a plurality of network elements.

Related Art

Network traffic, which can include wired or wireless traffic, is monitored by deploying appliance-based probes. The probes are developed by third-party vendors that use proprietary hardware and software to examine, collect, and process control plane and user plane traffic.

In order not to disrupt the network traffic, monitoring entails deploying proprietary taps near each network element or virtual network function of the network to replicate raw control plane or user plane traffic output by the network element or virtual network function. The traffic collected by the taps is aggregated by proprietary aggregation switches. The aggregation switches deliver the aggregated data to proprietary physical or virtual probes. The probes process the replicated control plane and user plane packets. This processing by the probes includes replicating some processing that is performed by the network elements or virtual network functions. Processes that are replicated include decrypting control plane packets and inspecting user plane packets. Decryption requires an exchange of decryption keys between the network element, or virtual network function, and the probe. Third party vendors charge license fees to provide data analysis and records output by the probes to analytic application servers that perform additional analysis on the records provided by the probes.

Costs incurred using probes for network traffic monitoring thus include costs associated with hardware taps, aggregation switches, hardware and/or software included in physical or virtual probes, replication of network traffic, exchange of decryption keys, and licensing costs required by probe vendors.

In addition to the costs incurred, deployment of taps, aggregation switches, and probes adds complexity to network design. As virtual network functions become more widely used, complexity associated with replicating and aggregating network traffic data increases due to the dynamic and mobile nature of the implemented functions. The complexity increases even further when virtual network functions are instantiated and relocated within data centers and between data centers in near real time.

SUMMARY

The disclosure is directed to a system to monitor a network. The system includes a user plane record aggregator that receives first data associated with a user plane packet, wherein the first data is selected by a user plane network element from second data, the second data is stored in a plurality of information fields, the plurality of information fields are associated with the user plane network element, the second data is obtained by the user plane network element from user plane traffic, and the user plane network element processes the user plane packet in accordance with a user plane network function. The system further includes an aggregation device that determines a characteristic associated with the user plane traffic from the first data, thereby monitoring the user plane traffic without requiring a tap.

In an embodiment, the user plane record aggregation device further receives third data associated with a plurality of user plane packets, wherein the third data is assigned by the user plane network element to one of a first group and a second group, the first group includes a first user plane packet associated with the plurality of user plane packets that correspond to an individual transaction, and the second group includes a second user plane packet associated with the plurality of user plane packets that correspond to an individual session. The aggregation device analyzes the first group separately from the second group.

In an embodiment, the third data is assigned by the user plane network element to one of a third group and a fourth group, the third group including a third user plane packet associated with a traffic flow segment, the fourth group including a fourth user plane packet associated with an application. An application associated with a packet herein refers to an application that sent the packet, is intended to receive the packet, or otherwise process the packet. For example, the application can be associated with the destinations or source of the packet. The application can be, for example, an application that is executed by a client processing device or a server processing device, such as a website or to exchange data with a mobile application (e.g., "app"). The aggregation device analyzes the third group separately from the fourth group.

In an embodiment, the third data includes a statistic determined by the user plane network element based on one of the first, second, third, and fourth user plane packet.

In an embodiment, the system includes an on-demand user plane packet aggregator that transmits a condition to the user plane network element. The user plane packet aggregator receives fourth data from the user plane network element, wherein the fourth data is a fifth user plane packet obtained by the user plane network element from the user plane traffic, the fifth user plane packet is selected from the plurality of user plane packets included in the user plane traffic, and the user plane network element selects the fifth user plane packet in accordance with the condition.

In an embodiment, the system further includes a control packet aggregator that receives fifth data associated with a control plane packet, wherein the fifth data is obtained from control plane traffic by a control plane network element, and the control plane network element processes the control plane packet in accordance with a control plane network function. The aggregation device determines a characteristic associated with the control plane traffic from the fifth data, thereby monitoring the control plane traffic without requiring a tap.

In an embodiment, the fifth data is decrypted by the control plane network element in response to the control plane network element receiving an encrypted control data packet.

In an embodiment, the fifth data is modified by the control plane network element to include identifying information that associates the control plane packet to one of a transaction and session. The aggregation device uses the fifth data to determine a characteristic associated with the one of the transaction and session based on the identifying information.

In an embodiment, the system further includes a control packet aggregator that receives fifth data associated with a control plane packet, wherein the fifth data is obtained from control plane traffic by a control plane network element, and the control plane network element processes the control plane packet in accordance with a control plane network function. The aggregation device analyzes two of the first data, the fourth data, and the fifth data concurrently to determine a characteristic associated with the user plane traffic and the control plane traffic.

In an embodiment, the user plane network element and the control plane network element are physical network elements.

In an embodiment, the user plane network element and the control plane network element are virtual network functions, wherein each of the user plane network element and the control plane network element emulate a physical network element.

The disclosure is further directed to a method. The method includes receiving by a user plane record aggregator first data associated with a user plane packet, wherein the first data is selected by a user plane network element from second data, the second data is stored in a plurality of information fields, the plurality of information fields are associated with the user plane network element, the second data is obtained by the user plane network element from user plane traffic, and the user plane network element processes the user plane packet in accordance with a user plane network function. The method further includes determining by an aggregation device a characteristic associated with the user plane traffic from the first data, thereby monitoring the user plane traffic without requiring a tap.

In an embodiment, the method further includes receiving by the user plane record aggregator third data associated with a plurality of user plane packets, wherein the third data is assigned by the user plane network element to one of a first group and a second group, the first group includes a first user plane packet associated with the plurality of user plane packets that correspond to an individual transaction, and the second group includes a second user plane packet associated with the plurality of user plane packets that correspond to an individual session. The method further includes analyzing by the aggregation device the first group separately from the second group.

In an embodiment, the method includes transmitting by an on-demand user plane packet aggregator a condition to the user plane network element, and receiving by the user plane packet aggregator fourth data from the user plane network element, wherein the fourth data is a fifth user plane packet obtained by the user plane network element from the user plane traffic, the fifth user plane packet is selected from the plurality of user plane packets included in the user plane traffic, and the user plane network element selects the fifth user plane packet in accordance with the condition.

In an embodiment, the method includes receiving by a control packet aggregator fifth data associated with a control plane packet, wherein the fifth data is obtained from control plane traffic by a control plane network element, and the control plane network element processes the control plane packet in accordance with a control plane network function. The method further includes determining by the aggregation device a characteristic associated with the control plane traffic from the fifth data, thereby monitoring the control plane traffic without requiring a tap.

In an embodiment of the method, the fifth data is decrypted by the control plane network element in response to the control plane network element receiving an encrypted control data packet.

The disclosure is further directed to a computer-readable device storing instructions that, when executed by an aggregation and analysis device, perform operations, which include receiving first data associated with a user plane packet, wherein the first data is selected by a user plane network element from second data, the second data is stored in a plurality of information fields, the plurality of information fields are associated with the user plane network element, the second data is obtained by the user plane network element from user plane traffic, and the user plane network element processes the user plane packet in accordance with a user plane network function. The operations further include determining a characteristic associated with the user plane traffic from the first data, thereby monitoring the user plane traffic without requiring a tap.

In an embodiment, the operations further include receiving third data associated with a plurality of user plane packets, wherein the third data is assigned by the user plane network element to one of a first group and a second group, the first group includes a first user plane packet associated with the plurality of user plane packets that correspond to an individual transaction, and the second group includes a second user plane packet associated with the plurality of user plane packets that correspond to an individual session. The operations further include analyzing the first group separately from the second group.

In an embodiment, the operations include transmitting a condition to the user plane network element, and receiving by the user plane packet aggregator fourth data from the user plane network element, wherein the fourth data is a fifth user plane packet obtained by the user plane network element from the user plane traffic, the fifth user plane packet is selected from the plurality of user plane packets included in the user plane traffic, and the user plane network element selects the fifth user plane packet in accordance with the condition.

In an embodiment, the operations further include receiving fifth data associated with a control plane packet, wherein the fifth data is obtained from control plane traffic by a control plane network element, the fifth data is decrypted by the control plane network element in response to the control plane network element receiving an encrypted control data packet, and the control plane network element processes the control plane packet in accordance with a control plane network function. The operations further include determining a characteristic associated with the control plane traffic from the fifth data, thereby monitoring the control plane traffic without requiring a tap.

Embodiments will become apparent from the following detailed description, which is to be read in connection with the accompanying drawings. It is to be understood, however, that the drawings are designed as an illustration only and not as a definition of the limits of this disclosure.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

The embodiments described herein are directed to methods and systems to monitor user plane and control plane traffic of a network by analyzing data obtained directly from network elements of the network. By receiving the data to be analyzed directly from the network elements, the monitoring can be performed without using probes or switches that replicate or mirror the user plane or control plane traffic.

Figure 1:
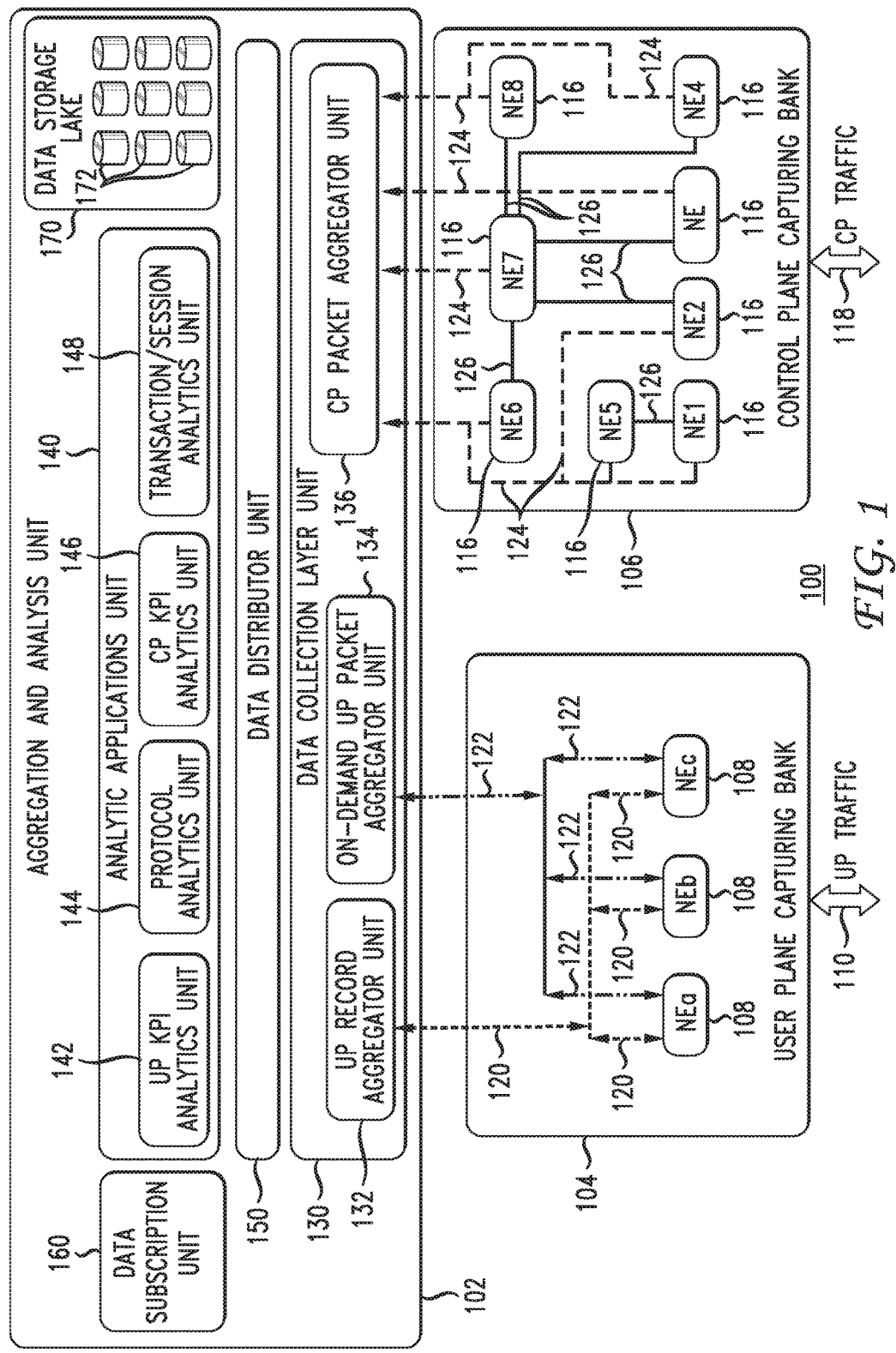
FIG. 1 shows a block diagram of a network monitoring system.

FIG. 1 shows a network monitoring system 100 that monitors data plane and control plane processing in a network. The network monitoring system 100 includes an aggregation and analysis unit 102 that receives selected data from a user plane (UP) capturing bank 104 and a control plane (CP) capturing bank 106. The UP capturing bank 104 captures UP packets from the UP traffic 110.

The term "user plane" as used herein refers to a portion of a network that bears data that is transferred by the network from a source device included in the network to a destination device included in the network. The devices can be virtualized. The term "UP traffic" as used herein refers to the data that is being transferred from the source device to the destination device. The data being transferred can be included in, for example, a voice call, a text message, or an internet browsing session, e.g., that was sent by a customer that subscribes to the network. The UP traffic can include UP packets in accordance with a protocol, such as transmission control protocol (TCP) and/or internet protocol (IP). The term "capture" as used herein refers to intercepting data, such as UP packets or data included therein, and storing (e.g., temporarily or long term) the intercepted data.

The term "control plane" as used herein refers to a portion of a network that determines which route(s) the UP traffic should be transferred along. The term "CP traffic" as used herein refers to data that is transferred to determine the routes. The CP traffic can include CP packets in accordance with a protocol (e.g., TCP and/or IP).

The UP capturing bank 104 includes a plurality of user plane network elements (NEs) 108. The term "UP network element," as referred to herein, refers to a physical or virtual element that performs or emulates one or more UP network functions. The UP network function includes processing user plane packets that the UP network element 108 receives from the user plane traffic 110. Emulating a network element or network function includes processing the user plane packets in accordance with the corresponding network element or network function (e.g., the UP element or UP network function that the UP NE 108 emulates).

Examples of UP network functions include routing of user plane traffic based on criteria, such as policy, entitlement, and destination. The destination can be indicated by data in the UP packet, for example a destination IP address or a class of service. The UP network function can include identifying the next UP NE 108 in a path of a UP packet, and/or forwarding the UP packet to the identified UP NE 108. The UP network function can further include adjusting translation of an IP address, e.g., from a private to a public IP address.

The term "CP network element," as referred to herein, refers to a physical or virtual element that performs or emulates one or more CP network functions. The CP network function includes processing CP packets that the CP network element 116 receives from the CP traffic 118. The CP packets can include requests to perform operations, for example assembling and disassembling communication channels that carry UP traffic or establishing a mobility web session. The operations may further include communicating with another CP NE 116, for example to request performance of an action or to validate request authorization (e.g., to determine whether a customer from which the associated UP traffic originated has entitlement or a subscription to make the request).

The user plane packets are included in user plane traffic 110 that flows from a source (not shown) into the UP capturing bank 104. The user plane packets flowing into the UP capturing bank 104 are operated on by one or more of the UP NEs 108 in accordance with the network function the UP NE 108 performs or emulates. The user plane traffic 110 that was operated on in accordance with the network function flows out of the UP capturing bank 104 to a next destination (not shown).

The user plane traffic 110 is located between the source and the next destination in accordance with real time operations of the network. The user plane traffic 110 is not a copy (also referred to as a mirror) but is original user plane traffic.

In addition to operating on the UP packet in accordance with the network function (or emulation thereof), the UP NEs 108 capture and operate on the captured UP packets to perform network monitoring tasks. In an embodiment, when capturing a packet from packet traffic, the traffic (e.g., contents of the traffic or characteristics of flow of the traffic) is not altered. Operations performed on the captured UP packets include assigning UP packets to respective groups based on the transaction (which is assigned to a first group), session (which is assigned to a second group), segment of traffic flow (which is assigned to a third group), or application the respective UP packets are associated with (assigned to a fourth group), analyzing the grouped packets, extracting selected performance measurement data related to the individual calls or transactions, determining statistics related to the grouped UP packets, and outputting the extracted performance measurement data or the statistics to the aggregation and analysis unit 102, e.g., at a selectable time interval, such as 1 minute or less. Performance of the monitoring tasks does not affect performance of the network function or emulation thereof, or affect the flow of the UP traffic 110.

Additionally, interfaces, such as application programming interfaces (APIs), are provided between the UP NEs 108 and the aggregation and analysis unit 102. Via the interface, the aggregation and analysis unit 102 instructs the UP NEs 108 to collect selected full UP packets in accordance with a condition communicated to the UP NEs 108 from the aggregation and analysis unit 102 via the APIs.

The CP capturing bank 106 includes a plurality of control plane network elements (NEs) 116. Each CP NE 116 is a physical network element that performs at least one network function to process control plane packets that it receives from the control plane traffic 118, or a virtual network function (VNF) that emulates a network element or network function and processes the control plane packets in accordance with the network element or network function that the CP NE 116 emulates. The control plane packets are included in control plane traffic 118 that flows from a source (not shown) into the CP capturing bank 106. The control plane packets flowing into the CP capturing bank 106 are operated on by one or more of the CP NEs 116 in accordance with the network function the CP NE 116 performs or emulates. The control plane traffic 118 that was operated on in accordance with the network function flows out of the CP capturing bank 106 to a next destination (not shown).

The control plane traffic 118 is located between the source and the next destination in accordance with real time operations of the network. The control plane traffic 118 is not a copy (or mirror) but is original control plane traffic.

In addition to operating on the CP packet in accordance with the network function (or emulation thereof), the CP NEs 116 capture and operate on the CP packets to perform network monitoring tasks. The network monitoring tasks performed by the CP NE 116 can include modifying (or enhancing) the control plane packets to include identifiers, such as a phone number or international mobile subscriber identity (IMSI), that relate the control plane packets to a transaction before outputting the modified control plane packets to the aggregation and analysis unit 102.

Specifications for configuring the UP NEs 108 and the CP NEs 116 can be based on specifications for the aggregation and analysis unit 102 to provide compatibility. These specifications can be determined at the design and manufacture stages and when configuring updated versions of the UP NEs 108 and the CP NEs 116.

Figure 2:
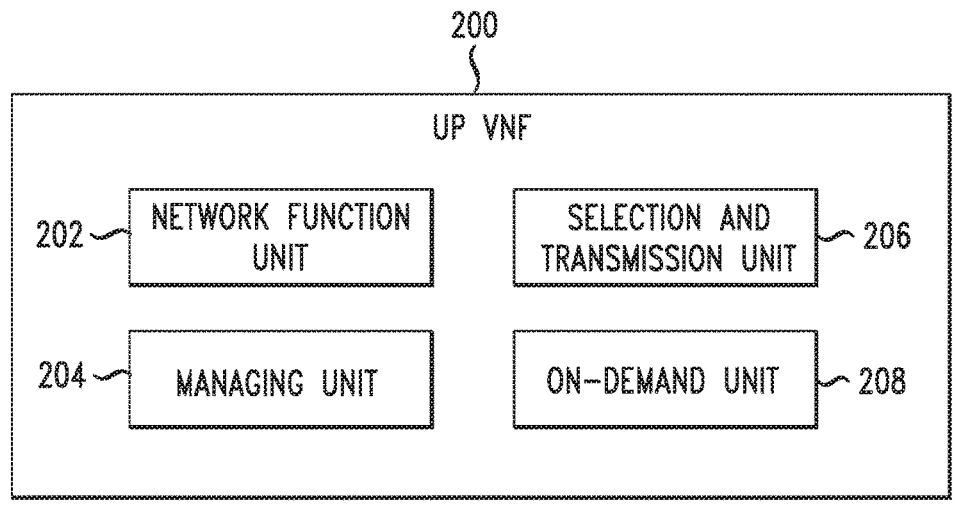
FIG. 2 shows a block diagram of a user plane virtual network function (VNF) of the network monitoring system.

FIG. 2 shows an embodiment of UP NE 108 configured as a UP VNF 200. The UP VNF 200 includes a network function unit 202, a managing unit 204, a selection and transmission unit 206, and an on-demand unit 208. The units 202-208 can be combined in any combination or divided into additional units. The functions of units 202-208 can be executed by one or more processing devices.

The network function unit 202 emulates a physical network element or a software network function that includes instructions which are executable only by a particular processing platform. The network function unit 202 includes instructions that emulate the network element or software network function, but that are executable independent of the particular platform. The instructions of the network function unit 202, when executed, perform one or more operations on a received user plane packet, wherein the operations emulate the physical network element or software network function.

In another embodiment in which the UP NE 108 is configured as a physical network element, the network element function unit 202 includes instructions to perform a network function that is executed on a particular processing platform. The network function can include, for example, performance of one or more operations on a user plane packet.

The managing unit 204, which manages data operated on by the UP VNF 200, includes a collection of management information (second data) about the UP VNF 200, for example, a management information base (MIB). The information can be stored as objects having information fields, e.g., MIB objects or data records (xDR). The objects or data records can be included in the UP VNF 200 or can be external to the UP VNF 200. The management information can be stored on the UP NE 108 or CP NE 116 and accessed by applications executed by the UP NE 108 or CP NE 116, or the management information can be stored on servers or systems that are adjunct and/or external to the UP NE 108 or CP NE 116. Examples of information fields in the MIB or data record include:

Calling customer phone or IMSI number;
Called customer phone or IMSI number;
Customer internet protocol (IP) address;
Website uniform resource locator (URL) visited;
Application accessed (e.g., transmission control protocol (TCP) port number used);
Class of service used during the session;
Radio technology used (UMTS/LTE, and the like);
Number of packets downloaded/uploaded;
Size of packets downloaded/uploaded;
Transmission duration of packets downloaded/uploaded;
Total network and application latency of packets downloaded/uploaded;
Packets bytes re-transmitted during upload/download;
Delay before receiving first byte (e.g., when browsing a website); and
Network element IP addresses (e.g., enode, serving gateway, and the like).

The selection and transmission unit 206 can select data (first data) from the data captured in the MIB or data records based on satisfaction of a condition, e.g., a network condition or a characteristic of a UP packet. The selection and transmission unit 206 can assign packets into one or more groups of packets. Each group is associated with a particular transaction, session, segment of traffic flow, or application. The selection and transmission unit 206 interfaces with the managing unit 204 to select data captured in the MIB or data records that is associated with user plane packets in a particular group. The selection and transmission unit 206 selects the data captured in the MIB or data records and processes the selected data independently from the network function performed by the network function unit 202 and without affecting operations performed by the network function unit 202.

MIB objects or data records of the managing unit 204 can provide data about a group of user plane packets. The selection and transmission unit 206 can select all of the information fields, or a subset of the information fields. The managing unit 204 thus provides selected data for a group of user plane packets formed by the selection and transmission unit 206. The selected data includes management information stored in the selected information fields.

The selection and transmission unit 206 can further operate on the selected data to generate output statistics related to the group of user plane packets. The selection of information fields, operation on the selected data obtained from the selected information fields, and/or generation of output can be performed upon satisfaction of a condition, such as at regular intervals, e.g., 15 second, 30 second, or one minute intervals, or some specific network condition.

The selection and transmission unit 206 further transmits the selected data for the group of user plane packets, or statistics about the group of user plane packets, to the aggregation and analysis unit 102 in a form (e.g., having a format and a type of information) that can be processed and analyzed by the aggregation and analysis unit 102.

A transaction can include, for example, a call over a network, including a cellular network, plain old transmission lines (POTS) network, or the Internet (e.g., for voice over internet protocol (VOIP)); an email; a text message; a data upload or download of various media, such as text, photographs, graphics, audio, and/or video; data streaming, such as audio and/or video; or audio and/or video conferencing. The data related to performance of an individual transaction can relate to a particular subscriber or all subscribers involved in the transaction. A session can include a series of transactions that are related to one another, such as a series of emails or text messages that are sent to multiple recipients or are related to one another by a reply or forward action, or a conference call. Traffic flow can include a series of transactions that flow through a particular UP VNF 200, or through the UP capturing bank 104, during a selected time period or based on existence of a predetermined network condition. A segment of the traffic flow can be designated based on a characteristic of the traffic flow, such as a time interval or a device (e.g., an originating, routing, or destination device). An application can be a software application associated with the network traffic, such as a texting, video streaming, voice-over-internet, or audio phone call application The selection and transmission unit 206 outputs the selected data (third data), and/or statistics associated with the selected data, along data path 120 (see FIG. 1). The data paths 120 are not limited to a particular configuration. Data is transmitted by the UP VNFs 200 along at least one data path 120 of the plurality of data paths 120, the plurality of data paths 120 being configured so that the data transmitted by the UP VNF 200 is received by the aggregation and analysis unit 102.

The on-demand unit 208 receives and processes a message from the aggregation and analysis unit 102, wherein the message communicates a condition for selecting UP packets and outputting captured data associated with the selected UP packets. The condition can include a single condition or a combination of conditions, such as the occurrence of an event (e.g., a request for a complete data packet or notification of a transmission failure), certain network attributes exceeding a threshold (such as latency, delay, transmission time), or satisfying an interval criteria (such as intervals for sampling UP packets based on time, quantity of UP packets in the UP traffic flow, or quantity of predetermined data elements in the UP traffic flow, or random intervals). The on-demand unit 208 further outputs to the aggregation and analysis unit 102, UP packets that satisfy the condition (also referred to as compliant UP packets).

The conditions can be communicated as messages via an interface between the aggregation and analytics unit 102 and the on-demand unit 208, such as an API. The message from the aggregation analysis unit 102 and the compliant UP packets submitted by the on-demand unit 208 are transmitted via a plurality of data paths 122 to the aggregation and analysis unit 102 (see FIG. 1). The data paths 122 are not limited to a particular configuration. Since only compliant UP packets are output from the UP VNFs 200 of UP capturing bank 104, the amount of data that is captured can be adjusted in accordance with the amount of analytics intended to be performed based on need/demand (troubleshooting needs vary based on network behavior). This can grossly reduce the amount of data that is captured when operations are running normally. Specific data can be obtained by changing the conditions established by the interface (e.g., API) of the on-demand UP packet aggregator unit 134.

Figure 3:
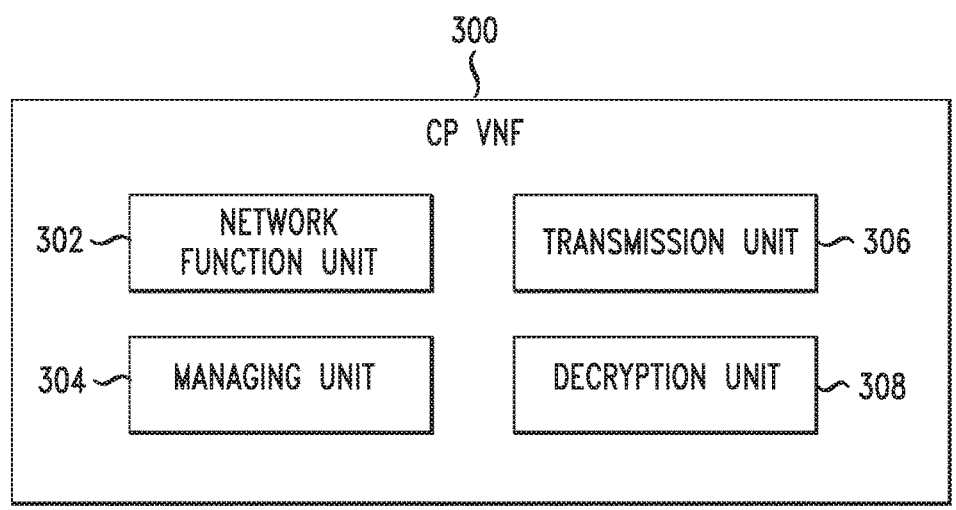
FIG. 3 shows a block diagram of a control plane VNF of the network monitoring system.

FIG. 3 shows an embodiment of CP NE 116 configured as a CP VNF 300. The CP VNF 300 further includes a network function unit 302, a managing unit 304, a transmission unit 306, and a decryption unit 308. The units 302-308 can be combined in any combination or divided into additional units. The functions of units 302-308 can be executed by one or more processing devices.

The network function unit 302 emulates a physical network element or a software network function that includes instructions which are executable only by a particular processing platform. The network function unit 302 includes instructions that emulate the network element or software network function, but that are executable independent of the particular platform. The instructions of the network function unit 302, when executed, perform one or more operations on a control plane packet that emulate the physical network element or software network function.

In another embodiment in which the CP NE 116 is configured as a physical network element, the network element function unit 302 includes instructions for performing a network function that is executed on a particular processing platform. The network function can include, for example, performance of one or more operations on a control plane packet.

The managing unit 304, which manages data operated on by the CP VNF 300, includes a collection of management information about the CP VNF 300, for example, an MIB. The information can be stored as objects, e.g., MIB objects or data records. The objects or data records can be included in the UP VNF 300 or can be external to the UP VNF 300. Examples of information fields in the MIB or data record include:

Transition to a specific state within a CP state machine;
Called customer phone or IMSI number; and
Customer IP address.

The managing unit 304 can compute and generate statistics (also referred to as management statistics) related data stored in the information fields. The transmission unit 306 interfaces with the managing unit 304 (e.g., with MIB objects or data records of the managing unit 304) to transmit the management statistics and output the information via data path 124 (see FIG. 1). In addition, the transmission unit 306 also modifies the control plane packets to include identifiers, such as a phone number or IMSI, that relate the control plane packets to a transaction, and sends a copy of the CP packets, as modified, to the CP packet aggregator unit 136 via data path 124.

The transmission unit 306 can further include selection capabilities for selecting information fields and transmitting data stored in the selected information fields to the aggregation and analysis unit 102. The selected information fields can be associated with CP traffic flow 116 or with a selected customer, transaction, session, traffic flow segment, or application used by the customer (e.g., as a destination or source). The transmission unit 306 can further select CP packets for a selected customer, transaction, session, traffic flow segment, or application to be captured and/or analyzed, including to be transmitted to the aggregation and analysis unit 102.

The decryption unit 308 decrypts data received from CP traffic 118 and/or from another CP VNF 300 for interfacing CP VNFs 300 via data flow 126. The decryption unit 308 decodes data that has been previously encrypted to render it back to its unencrypted state. The data decrypted by decryption unit 308 is processed by the network function unit 302. The data decrypted by decryption unit 308 is further available to the managing unit 304 to store the decrypted data in the information fields in the MIB or data record, and to the transmission unit 306 to transmit the decrypted data via data path 124 to the CP packet aggregator unit 136 of the aggregation and analysis unit 102 via data path 124.

The CP VNF 300 can further include an on-demand unit (not shown) that processes a condition provided by the CP packet aggregator 136, determines which CP packets satisfy the condition (e.g., are compliant), and provides the compliant CP packets to the CP packet aggregator 136, e.g., via transmission unit 306.

With returned reference to FIG. 1, the aggregation and analysis unit 102 includes a data collection layer unit 130, an analytic applications unit (aggregation device) 140, a data distributor unit 150, a data subscription unit 160, and data storage lake 170.

The data collection layer unit 130 includes a UP record aggregator unit 132, an on-demand UP packet aggregator unit 134, and a CP packet aggregator unit 136. The UP record aggregator unit (user plane record aggregator) 132 receives, via data path 120, the selected data (first data and/or third data) related to performance of data transmission at the individual transaction level, session level, UP traffic flow level, and application level that is transmitted by the selection and transmission unit 206 of UP NEs 108 (e.g., UP VNFs 200). The UP record aggregator unit 132 processes the received selected data according to its level (e.g., transaction, session, traffic flow, and/or application), and its type (e.g., the information field the data was stored in) so that it is in condition to be processed by the analytic applications unit 140. After aggregating the selected data, the UP record aggregator unit 132 transmits the selected data to the data distributor unit 150. The data distributor unit 150 then distributes the selected data to an appropriate unit of the analytic applications unit 140 based on a previously registered subscription. Subscriptions can be registered between the data distributor unit 150 and unit 142-unit 148 of the analytic applications unit 140 for sharing specific types or categories of data. Data distributor unit 150 further stores the selected data in the data storage lake 170.

In addition, the UP record aggregator unit 132 can transmit a request to a UP NE 108 to provide data from one or more selected information fields of the managing unit 204 or for a selected transaction, session, traffic flow segment, or application.

The on-demand UP packet aggregator unit 134 interfaces with a UP NE 108 to transmit a condition. The on-demand UP packet aggregator unit 134 receives, via data path 122, the compliant packets (fourth data) that satisfy the condition and are transmitted by the on-demand unit 208 of UP NEs 108. The on-demand UP packet aggregator unit 134 aggregates the compliant packets so that they are configured to be processed by the analytic applications unit 140. After processing the compliant packets, the on-demand UP packet aggregator unit 134 transmits the compliant packets to the data distributor unit 150. The data distributor unit 150 then distributes the compliant packets to an appropriate unit of the analytic applications unit 140 based on a previously registered subscription and also stores the data in the data storage lake 170.

The CP packet aggregator unit 136 receives, via data paths 124, the CP packets (fifth data) that are transmitted by the transmission unit 306 of CP NEs 116 (e.g., CP VNFs 300 or CP NE 500). The CP packet aggregator unit 136 aggregates the CP packets so that they are in condition to be processed by the analytic applications unit 140. After aggregating the CP packets, the CP packet aggregator unit 136 transmits the CP packets to the data distributor unit 150. The data distributor unit 150 then distributes the CP packets to an appropriate unit of the analytic applications unit 140 based on a previously registered subscription and also stores the data in the data storage lake 170.

The CP packet aggregator unit 136 can interface with a CP NE 116 (e.g., using an API) to request a CP NE 116 to provide data from one or more selected information fields of the managing unit 304, or for a selected transaction, session, traffic flow segment, or application. Additionally, the CP packet aggregator unit 136 can interface with the CP NE 116 to send a condition and receive and aggregate CP packets that satisfy the condition.

The analytic applications unit 140 includes one or more applications that perform analytics on the data received by data collection layer unit 130 from the UP NEs 108 of the UP capturing bank 104 and the CP NEs 116 of the CP capturing bank 106. Examples of analytic applications include UP key performance indicator (KPI) analytics unit 142, protocol analytics unit 144, CP KPI analytics unit 146, and transaction/session analytics unit 148.

The UP KPI analytics unit 142 processes the compliant UP packets received from the UP Packet Aggregator unit 132 to measure performance of key indicators, such as throughput, latency, bandwidth, jitter, and error rate. The UP KPI analytics unit 142 also correlates the UP records received from the UP record aggregator unit 132 and CP packet aggregator unit 136 to calculate aggregate key performance indicators. The protocol analytics unit 144 receives raw UP and CP packets (e.g., from selection and transmission unit 206 or transmission unit 306), parses the received packets using specific protocols knowledge (e.g., session initiated protocol (SIP) for voice over IP (VOIP)) and displays them in a human readable form for trouble analysis.

The transaction/session analytics unit 148 correlates, in a chronological sequence, steps used for transaction/session setup and termination using control plane packets transmitted by transmission unit 306 and collected by CP packet aggregator unit 136.

The CP KPI analytics unit 146 computes CP performance indicators from CP packets aggregated by the CP packet aggregator unit 136. Examples of performance indicators include, for example, the percentage of successful or failed calls.

The aggregation and analysis unit 102 thus interfaces directly with the UP NEs 108 and CP NEs 116 without an intermediary probe (physical or virtual). This eliminates the need for UP traffic mirroring, UP packet inspection, decryption of CP packets, or transmission of a decryption key by an intermediary probe. By eliminating the intermediary probe, hardware costs are reduced, licensing fees from third party probe vendors are eliminated, and design of the network monitoring system 100 is simplified. Latency caused by the mirroring of data and transferring the mirrored data before analysis is further minimized. Redundancy of mirroring or inspecting data by specialized probes is eliminated. The network monitoring system 100 can select and change analytic applications without being tied to one or more particular vendors. Complexity associated with adjusting intermediary probes to adapt to changes to or relocation of UP NEs 108 or CP NEs 116 is eliminated.

Additionally, a UP VNF 200 can access selected information fields associated with UP traffic flow 110 or with a selected customer, transaction, session, traffic flow segment, or application used by the customer (e.g., as destinations or sources). Targeted UP packets for a selected customer, transaction, session, traffic flow segment, or application can be captured and/or analyzed, e.g., transmitted to the aggregation and analysis unit 102 for analysis thereof. A CP VNF 200 can also include a selection unit that is configured to access selected information fields associated with CP traffic flow 118 or with a selected customer, transaction, session, traffic flow segment, or application used by the customer (e.g., as destinations or sources). Targeted CP packets for a selected customer, transaction, session, traffic flow segment, or application can be captured and/or analyzed, e.g., transmitted to the aggregation and analysis unit 102 for analysis thereof.

Since the analytic units (unit 142-unit 148) of the analytic applications unit 140 can receive data to analyze from different sources, namely the UP record aggregator unit 132, the on-demand UP packet aggregator unit 134, and the CP packet aggregator unit 136, the analytic units (unit 142-unit 148) can operate concurrently on the aggregated data, thereby accelerating analytic processes.

The network monitoring system 100 further includes a data storage lake 170 that includes at least one storage device 172 that is accessible to the analytic applications unit 140 and the data distributor unit 150 for accessing and storing data. The data storage lake 170 provides long term storage that is located close to the network that is being monitored and makes available the data for historical analysis and trending.

The data subscription unit 160 controls access to the distribution of data by data distribution unit 150 based on subscription by various applications and users.

Figure 4:
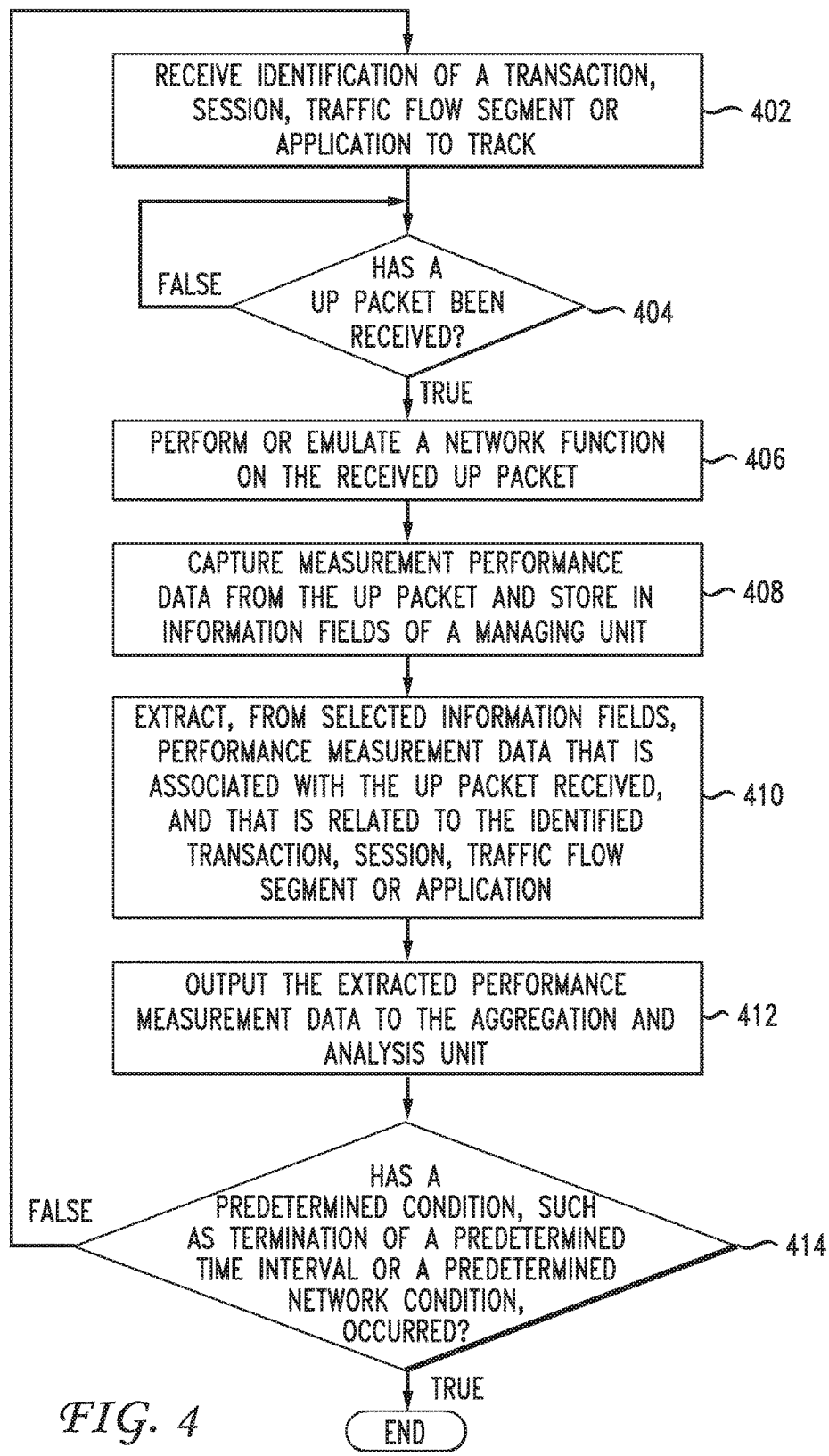
FIG. 4 shows a flowchart of operations performed by a selection and transmission unit of a user plane network element.

FIG. 4 shows a flowchart of operations performed by the UP NE 108. At operation 402, the UP NE 108 receives identification of at least one transaction, session, traffic flow segment, or application for which to aggregate information. Operation 402 can be performed by the selection and transmission unit 206 of UP VNF 200. At operation 404, a determination is made whether a UP packet has been received. If the determination is false, operation 404 is repeated. If the determination is true, the method continues at operation 404.

At operation 406, the UP NE 108 operates on the received UP packet to perform or emulate a network function. Operation 406 can be performed by the network function unit 202 of UP VNF 200. At operation 408, the UP NE 108 captures measurement performance data from the received UP packet and stores the measurement performance data in information fields of a managing unit of the UP NE 108. Operation 408 can be performed by the managing unit 204 of UP VNF 200.

At operation 410, the UP NE 108 extracts, from selected information fields, performance measurement data that is associated with the UP packet received, and that is related to the identified at least one transaction, session, traffic flow segment, or application. Operation 410 can be performed by the selection and transmission unit 206 of UP VNF 200. The selection and transmission unit 206 can select the information fields based on predetermined specifications. In an embodiment, the selection and transmission unit 206 can select the information fields based on a condition or request from the UP aggregator unit 132. Measurement data is thus aggregated from UP packets as they are received into separate groups for each of the identified at least one transaction, session, traffic flow segment, or application. Each of the groups can thus be processed and analyzed separately.

At operation 412, the UP NE 108 outputs the extracted performance measurement data to the aggregation and analysis unit 102. Operation 412 can be performed by the selection and transmission unit 206 of UP VNF 200.

At operation 414, the UP NE 108 determines whether a predetermined condition, such as termination of a predetermined time interval or a predetermined network condition has occurred. If the determination at operation 406 is false, the method continues at operation 402. If the determination is true, the method ends.

Figure 5:
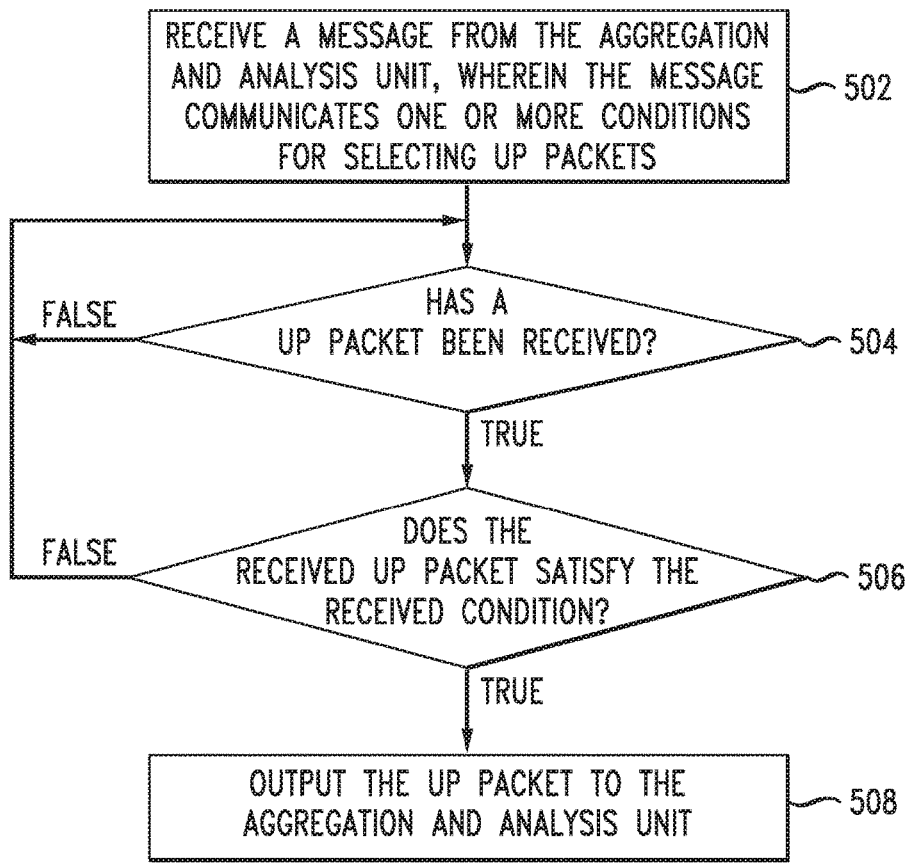
FIG. 5 shows a flowchart of operations performed by an on-demand unit of a user plane network element.

FIG. 5 shows a flowchart of operations performed by the UP NE 108 for determining and outputting compliant UP packets that satisfy a condition communicated from the on-demand UP packet aggregator unit 134. The operations can be performed by the on-demand unit 208 of UP VNF 200. At operation 502, a message is received from the aggregation and analysis unit 102, wherein the message communicates one or more conditions for selecting a UP packet. At operation 504, a determination is made whether a UP packet has been received. If the determination is false, operation 504 is repeated. If the determination is true, the method continues at operation 506. At operation 506, a determination is made whether the received UP packet satisfies the received condition. If the UP packet does satisfy the condition it is referred to as a compliant UP packet. If the determination is false, operation 504 is repeated. If the determination is true, the method continues at operation 508. At operation 508, the compliant UP packet is output to the on-demand UP packet aggregation unit 134 of the aggregation and analysis unit 102 via data path 122. Operation 508 can be performed by the on-demand unit 208 instructing the selection and transmission unit 206 to output the UP packet to the aggregation and analysis unit 102.

Figure 6:
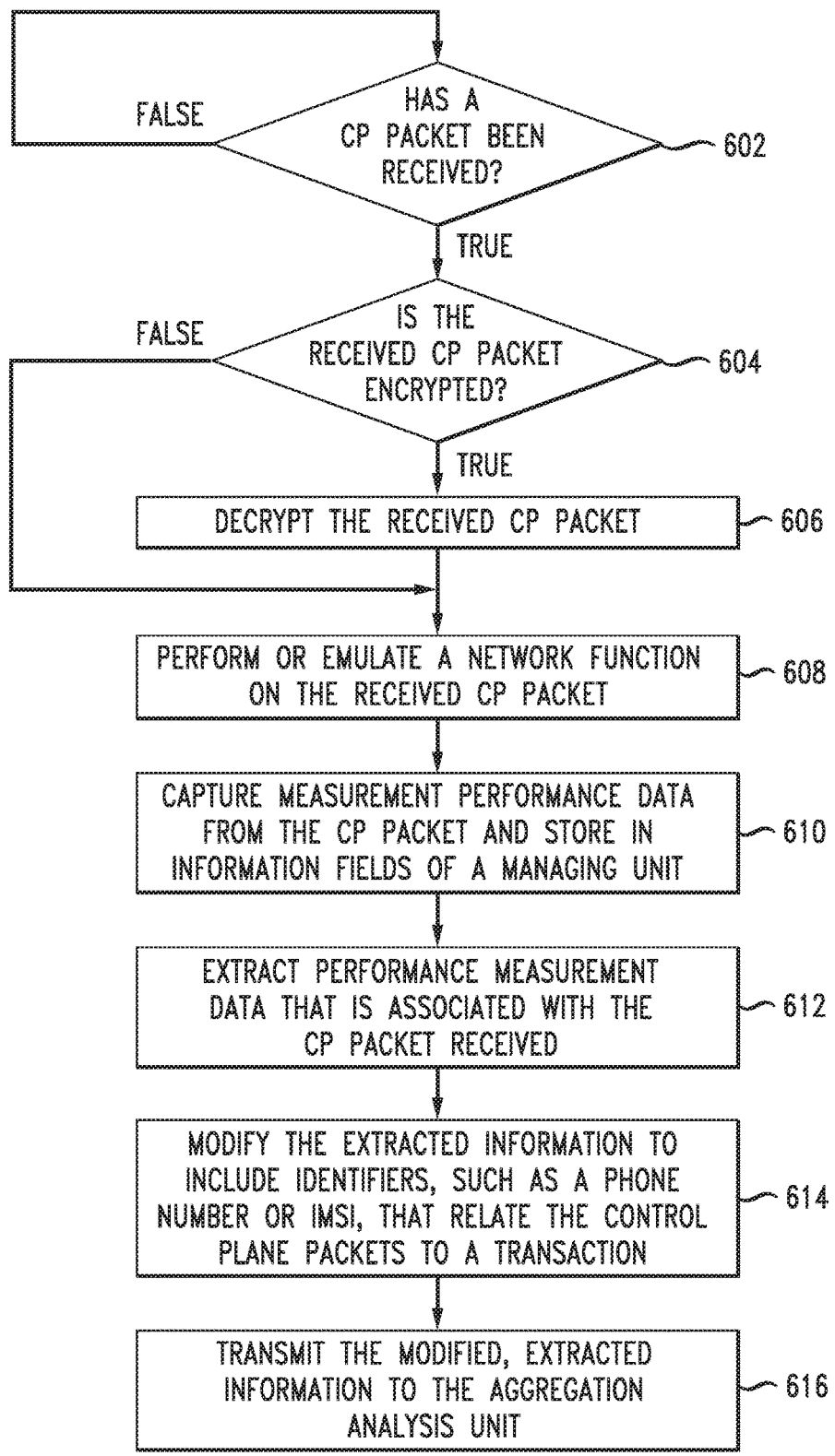
FIG. 6 shows a flowchart of operations performed by a transmission unit and a decryption unit of a control plane network element.

FIG. 6 shows a flowchart of operations performed by the CP NE 116. At operation 602, the CP NE 116 602 determines whether a CP packet been received. If the determination is false, operation 602 is repeated. If the determination is true, the method continues at operation 604. At operation 604, a determination is made whether the received CP packet is encrypted. If the determination is true, the method continues at operation 606. If the determination is false, the method continues at operation 608. At operation 606, the received CP packet is decrypted. Operations 604 and 606 can be performed by the decryption unit 308 of CP VNF 300. At operation 608, the CP NE 116 operates on the received CP packet to perform or emulate a network function. Operation 608 can be performed by the network function unit 302 of CP VNF 300.

At operation 612, the CP NE 116 captures measurement performance data from the CP packet and stores the measurement performance data in information fields of a managing unit of the CP NE 116. Operation 612 can be performed by the managing unit 304 of CP VNF 300. At operation 614, the extracted information is modified to include identifiers, such as a phone number or IMSI, that relate the control plane packets to a transaction. At operation 616, the modified, extracted information is transmitted to the aggregation analysis unit 102 via data path 124.

Figure 7:
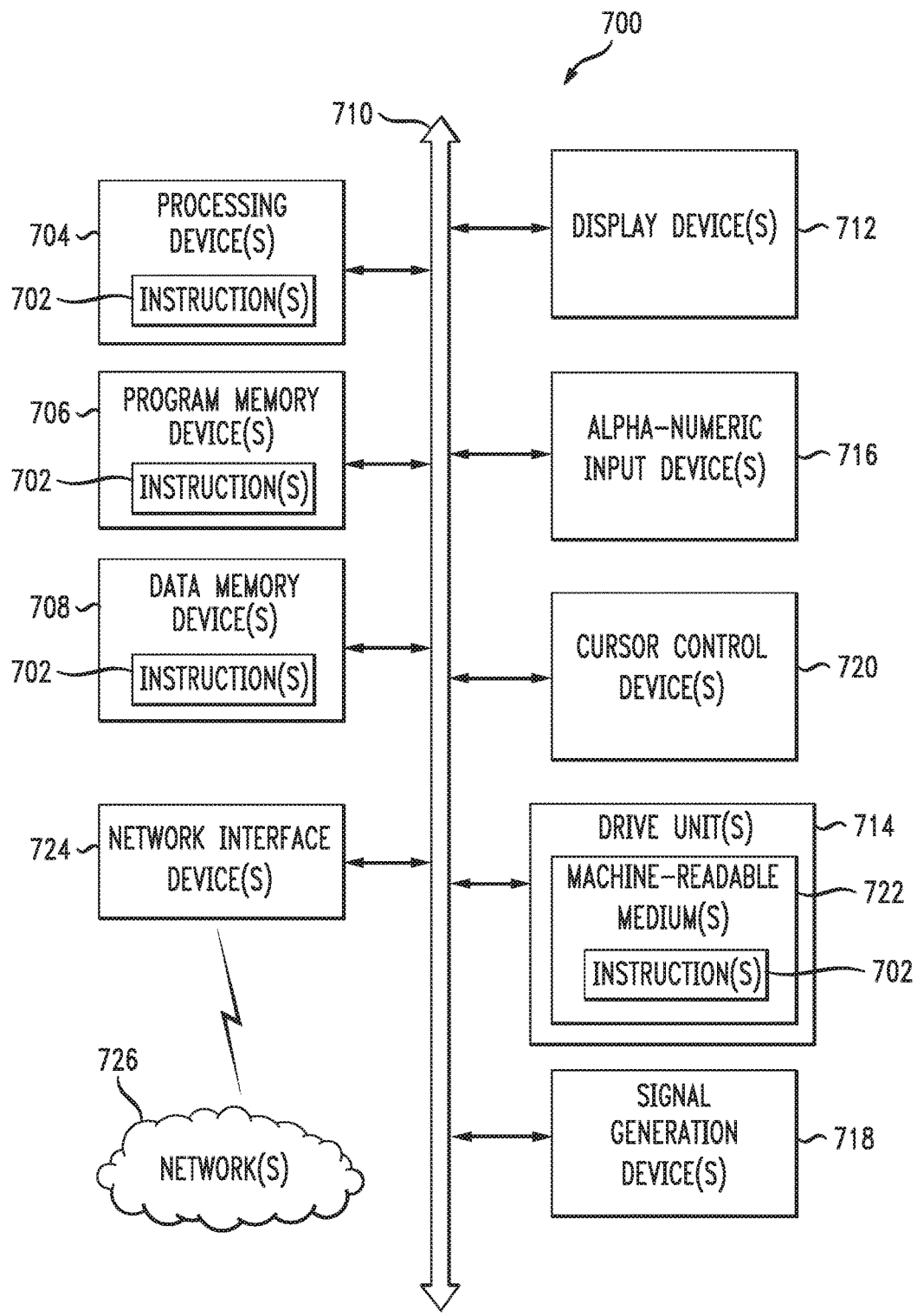
FIG. 7 shows a block diagram of at least a portion of an exemplary machine in the form of a computing system configured to perform methods according to one or more embodiments disclosed herein.

FIG. 7 is a block diagram of an embodiment of a machine in the form of a computing system 700, within which a set of instructions 702, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 700 may include a processing device(s) 704 (e.g., a central processing unit (CPU), a graphics processing unit (GPU), or both), program memory device(s) 706, and data memory device(s) 708, which communicate with each other via a bus 710. The computing system 700 may further include display device(s) 712 (e.g., liquid crystals display (LCD), a flat panel, a solid state display, or a cathode ray tube (CRT)). The computing system may include input device(s) 716 (e.g., a keyboard), cursor control device(s) 720 (e.g., a mouse), disk drive unit(s) 714, signal generation device(s) 718 (e.g., a speaker or remote control), and network interface device(s) 724.

The disk drive unit(s) 714 may include machine-readable medium(s) 722, on which is stored one or more sets of instructions 702 (e.g., software) embodying any one or more of the methodologies or functions disclosed herein, including those methods illustrated herein. The instructions 702 may also reside, completely or at least partially, within the program memory device(s) 706, the data memory device(s) 708, and/or within the processing device(s) 704 during execution thereof by the computing system 700. The program memory device(s) 706 and the processing device(s) 704 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The disclosed embodiments contemplate a machine-readable medium or computer-readable medium containing instructions 702, or that which receives and executes instructions 702 from a propagated signal so that a device connected to a network environment 726 can send or receive voice, video or data, and to communicate over the network 726 using the instructions 702. The instructions 702 may further be transmitted or received over a network 726 via the network interface device(s) 724. The machine-readable medium may also contain a data structure for storing data useful in providing a functional relationship between the data and a machine or computer in an illustrative embodiment of the disclosed systems and methods.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the disclosed subject matter may be referred to herein, individually and/or collectively, by the term "embodiment" merely for convenience and without intending to voluntarily limit the scope of this application to any single embodiment or concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. § 1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, disclosed subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more programs running on a processing device. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing, can also be constructed to implement the methods, functions or logic described herein.

It should also be noted that software, which implements the disclosed methods, functions or logic, may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the disclosed subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments may be referred to herein, individually and/or collectively, by the term "embodiment" merely for convenience and without intending to voluntarily limit the scope of this application to any single embodiment or concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, disclosed subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A system that monitors user plane traffic flow associated with a network, the system comprising:
a user plane record aggregation device receiving first data associated with a user plane packet, the first data comprising a type, the first data associated with data transmission at one of a plurality of hierarchical levels comprising an individual transaction level, session level, user plane traffic flow level, and application level, the first data including network management information, the user plane record aggregation device processing the first data according to the type and the hierarchical level so that the first data is configured for analytic processing, the first data being selected by a user plane network element from second data based on satisfaction of a condition, the condition being at least one of a request for a data packet, notification of transmission failure, or satisfaction of interval criteria for sampling user plane packets based on at least one of time, quantity of user plane packets in the user plane traffic flow, or quantity of data elements in the user plane traffic flow, the second data stored in an information field associated with the user plane network element, the second data obtained by the user plane network element from the user plane traffic, the user plane network element processing the user plane packet in accordance with a user plane network function, the user plane record aggregation device interfacing with the user plane network element; and an aggregation device determining a characteristic associated with the user plane traffic from the first data.

2. The system defined by claim 1, wherein the user plane record aggregation device receives third data associated with a plurality of user plane packets, the third data assigned by the user plane network element to one of a first group or a second group, the first group including a first user plane packet associated with the plurality of user plane packets corresponding to an individual transaction, the second group including a second user plane packet associated with the plurality of user plane packets corresponding to an individual session, the aggregation device analyzing the first group separately from the second group.

3. The system defined by claim 2, wherein the third data is assigned by the user plane network element to one of a third group or a fourth group, the third group including a third user plane packet associated with a traffic flow segment, the fourth group including a fourth user plane packet associated with an application, the aggregation device analyzing the third group separately from the fourth group.

4. The system defined by claim 3, wherein the third data includes a statistic determined by the user plane network element based on one of the first user plane packet, second user plane packet, third user plane packet, or fourth user plane packet.

5. The system defined by claim 1, further comprising an on-demand user plane packet aggregation device, the on-demand user plane packet aggregation device transmitting a condition to the user plane network element, the on-demand user plane packet aggregation device receiving fourth data from the user plane network element, the fourth data including a fifth user plane packet obtained by the user plane network element from the user plane traffic, the fifth user plane packet selected by the user plane network element from the plurality of user plane packets included in the user plane traffic, the fifth user plane packet selected by the user plane network element in accordance with the condition.

6. The system defined by claim 1, further comprising a control packet aggregation device that receives fifth data associated with a control plane packet, the fifth data obtained from control plane traffic by a control plane network element, the control plane network element processing the control plane packet in accordance with a control plane network function, the aggregation device determining a characteristic associated with the control plane traffic from the fifth data, thereby monitoring the control plane traffic without requiring a tap.

7. The system defined by claim 6, wherein the fifth data is decrypted by the control plane network element in response to the control plane network element receiving an encrypted control data packet.

8. The system defined by claim 6, wherein the fifth data is modified by the control plane network element to include identifying information that associates the control plane packet to one of a transaction or a session, the aggregation device using the fifth data to determine a characteristic associated with one of the transaction or the session based on the identifying information.

9. The system defined by claim 5, wherein a control packet aggregation device receives the fifth data associated with a control plane packet, the fifth data obtained from control plane traffic by a control plane network element, the control plane network element processing the control plane packet in accordance with a control plane network function, the aggregation device analyzing at least two of the first data, fourth data, or fifth data concurrently to determine a characteristic associated with the user plane traffic and the control plane traffic.

10. The system defined by claim 6, wherein the user plane network element and the control plane network element are physical network elements.

11. The system defined by claim 6, wherein the user plane network element and the control plane network element are virtual network functions, each of the user plane network element and the control plane network element emulating a physical network element.

12. A method of monitoring user plane traffic flow associated with a network, the method comprising:
receiving, by a user plane record aggregation device, first data associated with a user plane packet, the first data comprising a type, the first data associated with data transmission at one of a plurality of hierarchical levels comprising an individual transaction level, session level, user plane traffic flow level, and application level, the first data including network management information, the user plane record aggregation device processing the first data according to the type and the hierarchical level so that the first data is configured for analytic processing, the first data being selected by a user plane network element from second data based on satisfaction of a condition, the condition being at least one of a request for data packet, notification of transmission failure, or satisfaction of interval criteria for sampling the user plane packets based on at least one of time, quantity of user plane packets in the user plane traffic flow, or quantity of predetermined data elements in the user plane traffic flow, the second data stored in an information field associated with the user plane network element, the second data obtained by the user plane network element from user plane traffic in accordance with a user plane network function, the user plane record aggregation device interfacing with the user plane network element; and determining, by an aggregation device, a characteristic associated with the user plane traffic from the first data.

13. The method defined by claim 12, further comprising:
receiving, by the user plane record aggregation device, third data associated with a plurality of user plane packets and assigned by the user plane network element to one of a first group or second group, the first group including a first user plane packet associated with the plurality of user plane packets corresponding to an individual transaction, the second group including a second user plane packet associated with the plurality of user plane packets corresponding to an individual session; and analyzing by the aggregation device the first group separately from the second group.

14. The method defined by claim 12, further comprising:
transmitting by an on-demand user plane packet aggregation device a condition to the user plane network element; and receiving by the on-demand user plane packet aggregation device fourth data from the user plane network element, the fourth data including a fifth user plane packet obtained by the user plane network element from the user plane traffic, the fifth user plane packet selected in accordance with the condition by the user plane network element from the plurality of user plane packets included in the user plane traffic.

15. The method defined by claim 12, further comprising:
receiving by a control packet aggregation device fifth data associated with a control plane packet, the fifth data obtained from control plane traffic by a control plane network element, the control plane network element processing the control plane packet in accordance with a control plane network function; and
determining by the aggregation device a characteristic associated with the control plane traffic from the fifth data, thereby monitoring the control plane traffic without requiring a tap.

16. The method defined by claim 15, wherein the fifth data is decrypted by the control plane network element in response to the control plane network element receiving an encrypted control data packet.

17. A non-transitory computer-readable device storing instructions that, when executed by a computing device, cause the computing device to perform operations comprising:
receiving first data associated with a user plane packet, the first data comprising a type, the first data associated with performance of data transmission at one of a plurality of hierarchical levels comprising an individual transaction level, session level, user plane traffic flow level, and application level, the first data including network management information, the user plane record aggregation device processing the first data according to the type and the hierarchical level so that the first data is configured for analytic processing, the first data being selected by a user plane network element from second data based on satisfaction of a condition, the condition being at least one of a request for data packet, notification of transmission failure, or satisfaction of interval criterion for sampling user plane packets based on at least one of time, quantity of user plane packets in the user plane traffic flow, or quantity of predetermined data elements in the user plane traffic flow, the second data stored in an information field associated with the user plane network element, the second data obtained by the user plane network element from user plane traffic, the user plane network element processing the user plane packet in accordance with a user plane network function, the computing device interfacing with the user plane network element; and
determining a characteristic associated with the user plane traffic from the first data.

18. The non-transitory computer-readable device defined by claim 17, the operations further comprising:
receiving third data associated with a plurality of user plane packets, the third data assigned by the user plane network element to one of a first group or a second group, the first group including a first user plane packet associated with the plurality of user plane packets corresponding to an individual transaction, the second group including a second user plane packet associated with the plurality of user plane packets corresponding to an individual session; and
analyzing the first group separately from the second group.

19. The non-transitory computer-readable device defined by claim 17, the operations further comprising:
transmitting a condition to the user plane network element; and
receiving fourth data from the user plane network element, the fourth data including a fifth user plane packet obtained by the user plane network element from the user plane traffic, the fifth user plane packet being selected in accordance with the condition by the user plane network element from the plurality of user plane packets included in the user plane traffic.

20. The non-transitory computer-readable device defined by claim 17, the operations further comprising:
receiving fifth data associated with a control plane packet, the fifth data obtained from control plane traffic by a control plane network element, the control plane network element processing the control plane packet in accordance with a control plane network function; and
determining a characteristic associated with the control plane traffic from the fifth data, thereby monitoring the control plane traffic without requiring a tap, the fifth data being decrypted by the control plane network element in response to the control plane network element receiving an encrypted control data packet.

* * * * *